United States Patent
Wang et al.

(10) Patent No.: US 6,797,252 B2
(45) Date of Patent: Sep. 28, 2004

(54) HYDROCARBON GAS TO LIQUID CONVERSION PROCESS

(75) Inventors: Daxiang Wang, Ponca City, OK (US); Barbara A. Belt, Seabrook, TX (US); Vincent H. Melquist, Ponca City, OK (US); Steve R. Landis, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/303,606

(22) Filed: Nov. 25, 2002

(65) Prior Publication Data

US 2004/0101473 A1 May 27, 2004

(51) Int. Cl.[7] .......................... C01B 3/26; C07C 29/151
(52) U.S. Cl. ...................... 423/651; 252/373; 518/700; 518/703
(58) Field of Search .................. 252/373; 423/651, 423/652; 518/700, 703

(56) References Cited

U.S. PATENT DOCUMENTS

| | | | | |
|---|---|---|---|---|
| 4,110,359 A | * | 8/1978 | Marion | 518/703 |
| 5,441,990 A | * | 8/1995 | Robin et al. | 518/703 |
| 6,342,197 B1 | * | 1/2002 | Senetar et al. | 423/652 |

OTHER PUBLICATIONS

Article entitled "*Research program on Mobile $H_2$ production—improving transient response of reformers,*" by Dr. Greg Jackson et al., http://www.glue.umd.edu/~gsjackso/gsjreform.html, Fuel Reforming—UMCP (no date).

Article entitled "*Fundamentals of industrial catalytic processes,*" Robert J. Farrauto and Calvin H. Bartholomew, Blackie Academic & Professional, pp. 339–359, 1997.

Article entitled "*Maximizing $H_2$ production by combined partial oxidation of $CH_4$ and water gas shift reaction,*" by P.S. Malya et al., Applied Catalysis A: General 196, pp. 65–72, 2000.

* cited by examiner

*Primary Examiner*—Stanley S. Silverman
*Assistant Examiner*—Maribel Medina
(74) *Attorney, Agent, or Firm*—Conley Rose, P.C.

(57) ABSTRACT

The present invention is directed towards a process that allows for the adjustment of hydrogen concentration in a syngas product or Fischer-Tropsch feedstock stream. In particular, the invention is identified as an improved process for producing syngas comprising a secondary chemical reaction, preferably a water gas shift reaction, that allows for the adjustment of the hydrogen concentration in a syngas product stream. Ultimately, the present invention is for an improved process for converting hydrocarbon-containing gas to liquid hydrocarbons.

20 Claims, 2 Drawing Sheets

HYDROCARBON GAS TO LIQUID CONVERSION PROCESS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention generally relates to the preparation of liquid hydrocarbons from natural gas/methane, oxygen and/or steam. In particular, the present invention relates to an improved method for adjusting the hydrogen to carbon monoxide ratio in a synthesis gas product stream prior to addition into a hydrocarbon synthesis reactor.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons, alcohols and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas intermediate is converted to higher hydrocarbon products by processes such as the Fischer-Tropsch Synthesis, or to alcohols through alcohol synthesis.

Current industrial use of methane as a chemical feedstock proceeds by the initial conversion of methane to carbon monoxide and hydrogen by either steam reforming or catalytic partial oxidation ("CPOX"). Steam reforming currently is the major process used commercially for the conversion of methane to synthesis gas, the reaction proceeding according to Reaction (1).

$$CH_4 + H_2O \leftrightarrow CO + 3H_2 \tag{1}$$

Although steam reforming has been practiced for over five decades, efforts to improve the energy efficiency and reduce the capital investment required for this technology continue. The steam reforming reaction is endothermic (the heat of reaction (1) is about 9 kcal/mol of methane), requiring the expenditure of large amounts of fuel to produce the necessary heat for the industrial scale process. Another drawback of steam reforming is that, if used as a Fischer-Tropsch feedstock, the 3:1 ratio of $H_2$:CO products requires the removal of hydrogen to obtain the desired hydrogen to CO ratio of about 2.1 to about 2.5. Also, the typically large steam reforming plants are not practical to set up at remote sites of natural gas formations.

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial or direct oxidation of methane theoretically yields a syngas mixture with a $H_2$:CO ratio of 2:1, as shown in Reaction (2):

$$CH_4 + \tfrac{1}{2}O_2 \leftrightarrow CO + 2H_2 \tag{2}$$

The $H_2$:CO ratio for this reaction is closer to that desired for the downstream conversion of syngas to chemicals such as methanol or other fuels than is the $H_2$:CO ratio from steam reforming. In addition, the CPOX reaction is exothermic (−8.5 kcal/mol-methane), in contrast to the endothermic steam reforming reaction. Furthermore, oxidation reactions are typically much faster than reforming reactions. This allows the use of much smaller reactors for catalytic partial oxidation processes, i.e., short contact time reactors, which is impossible in a conventional steam reforming process. All of these factors lower the cost for the conversion of methane or natural gas and make the CPOX reaction much more attractive for commercial use.

Although there is a theoretical $H_2$:CO ratio of 2:1 in the CPOX product stream at 100% conversion, in reality, the ratio ranges from about 1.6 to about 2.1 at about 70–99% conversion. Thus, CPOX reactions typically also require an adjustment of the $H_2$:CO ratio prior to use as a Fischer-Tropsch feedstock. Because the steam reforming reaction is already more costly, in terms of energy consumption, it is logical to focus research efforts on ways to improve the $H_2$/CO ratio of the CPOX reactions and/or efficient and cost effective ways to adjust the $H_2$/CO ratio.

Despite research efforts to date, there is still a need for an improved method for the conversion of hydrocarbon gas to liquid hydrocarbons that includes a cost effective controllable process for adjusting the hydrogen to CO ratio of a synthesis gas product stream or Fischer-Tropsch feedstock stream.

SUMMARY OF THE INVENTION

The present invention allows for the adjustment of hydrogen concentration in a syngas product stream or Fischer-Tropsch feedstock stream. In particular, the invention provides an improved process for producing syngas comprising a secondary chemical reaction, preferably a water gas shift reaction, that allows for the adjustment of the hydrogen concentration in the syngas product stream. The water gas shift reaction is shown in Reaction (3). Ultimately, the present invention comprises an improved process for converting hydrocarbon-containing gas to liquid hydrocarbons.

$$CO + H_2O \rightarrow CO_2 + H_2 \tag{3}$$

In one preferred embodiment, the improved process comprises (a) reacting a hydrocarbon-containing gas, such as methane or natural gas with oxygen, air or some other oxygen source in a syngas reactor to produce syngas; (b) obtaining a slip stream of the syngas of step (a); (c) reacting the slip stream from step (b) in a secondary reactor to produce a hydrogen rich product stream; and (d) introducing the hydrogen rich product stream of step (c) into the syngas stream of step (a) downstream of the slip stream removal of step (b). The volume of the slip stream can be controlled and the hydrogen rich product stream can be added back to the primary syngas stream in a controlled fashion such that an optimum hydrogen to carbon monoxide ratio could be obtained in the final combined streams.

In another preferred embodiment, the present invention comprises using the improved syngas product stream described above as a Fischer-Tropsch feedstock to produce liquid hydrocarbons. The hydrogen and carbon monoxide can be easily and continually adjusted so as to maintain an optimum ratio for the Fischer-Tropsch process.

According to the present invention, the syngas product streams of the various embodiments have adjustable hydrogen to CO ratios. The ratios are adjusted using a secondary chemical reaction, preferably a water gas shift reaction. According to the present invention, the ratio can be adjusted from about 1.6 to about 10.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
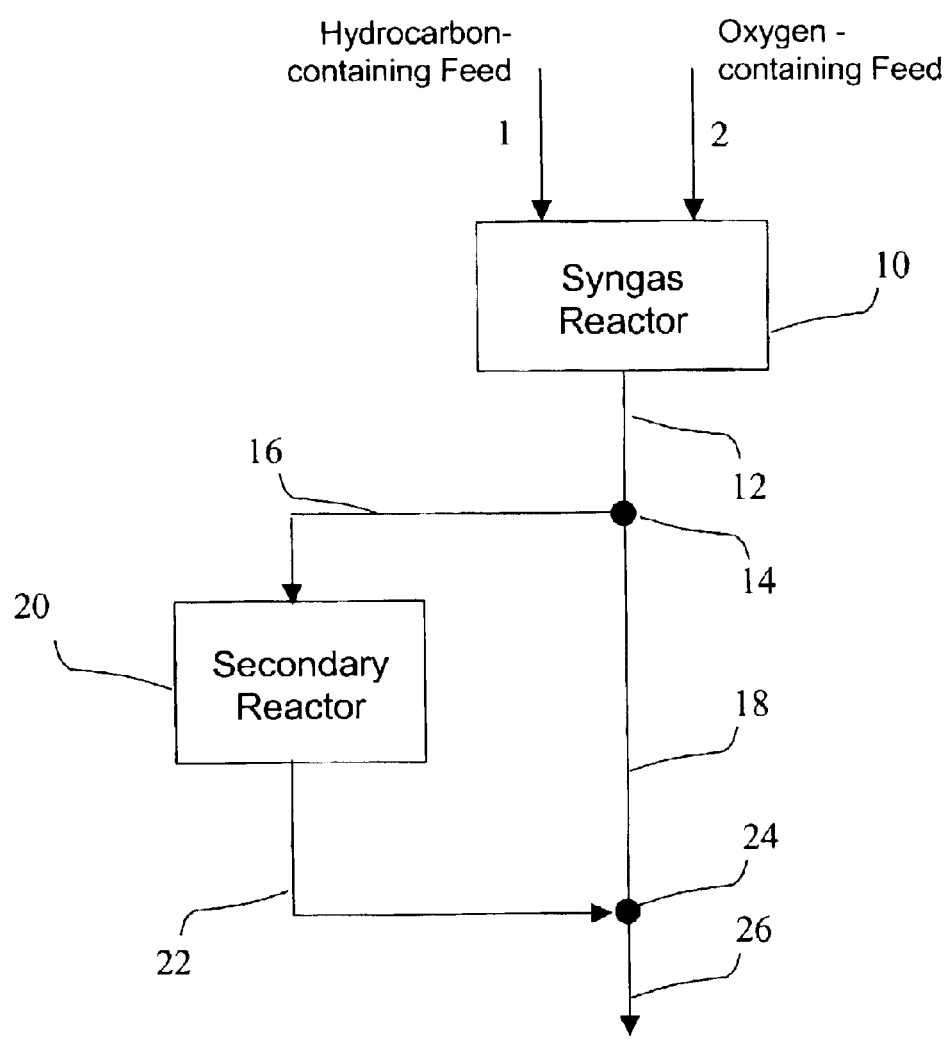
FIG. 1 is a syngas flow diagram in accordance with the present invention.

There are shown in the drawings, and herein will be described in detail, specific embodiments of the present invention with the understanding that the present disclosure is to be considered an exemplification of the principles of the invention, and is not intended to limit the invention to that illustrated and described herein. Many variations and modifications of the system and apparatus are possible and are within the scope of this invention.

Referring to FIG. 1, a natural gas to syngas flow diagram is shown to illustrate one general embodiment of the present invention. A hydrocarbon containing feed stream 1 (such as methane, natural gas) and an oxygen containing feed stream 2 (such as air) are used as reactants and passed through a syngas reactor 10 to produce a syngas product stream 12. Syngas is primarily hydrogen and carbon monoxide, however, oxygen, carbon dioxide, water and light hydrocarbons may also be present. In the preferred embodiment, a slipstream 16 of the syngas product stream 12 is obtained at point 14. The syngas slipstream 16 is passed through a secondary reactor 20 that promotes a reaction between carbon monoxide and water. The secondary reactor 20 produces a hydrogen rich gas stream 22 that can then be combined with the syngas product stream 18 at point 24 to form an adjusted syngas stream 26. The combined stream 26 is a hydrogen adjusted syngas product that can be used as a reactant in any number of subsequent processes. It should be appreciated that many variations or additions can be incorporated that are within the scope of the invention, e.g., upstream of the secondary reactor 20, a recycling stream containing CO, hydrogen, light hydrocarbons, etc. may be blended into the syngas stream. In addition, a slip stream of syngas product stream 12 may be used for other purposes. Alternatively, a slip stream of stream 22 from reactor 20 may be delivered to other sections of the process as a hydrogen rich gas supply.

Syngas reactor 10 can comprise any of the synthesis gas technology (reactor designs) known in the art. The hydrocarbon-containing feed is almost exclusively obtained as natural gas. However, the most important component is generally methane. Methane or other suitable hydrocarbon feedstocks (hydrocarbons with four carbons or less) are also readily available from a variety of other sources such as higher chain hydrocarbon liquids, coke, hydrocarbon gases, etc., all of which are known in the art. Similarly, the oxygen-containing gas may come from a variety of sources and will be somewhat dependent upon the nature of the reaction being used. For example, a partial oxidation reaction requires diatomic oxygen as a feedstock while steam reforming requires only steam. It should be appreciated that the present invention requires that at least a portion of the syngas be prepared from a partial oxidation reaction.

Regardless of their sources, the hydrocarbon-containing feed and the oxygen-containing feed are reacted under catalytic conditions. The catalyst compositions useful for synthesis gas generation reactions are well known in the art. They generally include a catalytic metal and one or more promoters on a support structure. The literature is replete with catalyst compositions and preparation techniques that are useful in the present invention, i.e., partial oxidation catalysts. These are well known to those of ordinary skill in the art. The support structures often dictate the type of catalyst bed that must be used. For example, fixed beds typically comprise monoliths and large particle sized supports. Small particle sized supports tend to be more useful in fluidized beds.

The synthesis gas feedstocks (hydrocarbon and oxygen gasses) are generally preheated, mixed and passed over or through the catalyst bed. As the mixed feedstocks contact the catalyst the synthesis reactions take place. The synthesis gas product contains primarily hydrogen and carbon monoxide, however, many other minor components may be present including steam, nitrogen, carbon dioxide, etc., as well as unreacted feedstock, such as methane and/or oxygen. Still referring to FIG. 1, when the synthesis gas product, i.e., syngas, is passed from syngas reactor 10 to secondary reactor 20, it should be appreciated that the syngas may undergo various treatments prior to introduction into secondary reactor 20.

Secondary reactor 20 is preferably a water gas shift (WGS) reactor. A water gas shift reaction is one in which carbon monoxide reacts with water in the presence of a catalyst to produce carbon dioxide and hydrogen as shown in reaction (3). This reaction is moderately exothermic with heat of reaction of −41.4 kJ/mol-CO. Thus, in one embodiment, syngas slip stream 16 is passed into a WGS reactor and the carbon monoxide in stream 16 reacts with water when the two reactants come in contact with the WGS catalyst. The water is typically added as steam that mixes with the incoming syngas prior to exposure to the WGS catalyst.

WGS reactors can be operated from about 200° C. to about 1100° C., preferably from about 200° C. to about 450° C. The performance of a water gas shift reactor is independent of the operation of reactor 10. The operation of reactor 20 can be selected based on the gas stream pressure of stream 12 and stream 26 as desired for the process. This pressure can range from atmosphere to 300 atmosphere. The temperature selected will ultimately depend on the WGS catalyst composition, the amount of conversion desired and the temperature of the incoming reactant gases. Typically, the lower the temperature the better the equilibrium conversion. Examples of WGS catalysts suitable for the present invention include but are not limited to iron based catalysts, such as $Fe_3O_4/Cr_2O_3$, or copper based catalysts, such as $CuO/ZnO/Al_2O_3$, The Cu based catalysts are low temperature type catalysts, but tend to be unstable. The best operation temperature range for Cu based catalyst is from 180° C. to 260° C. Above that range, catalysts start to deactivate due to sintering of active component, Cu. The Fe based catalysts are very stable, but have lower activities that require higher temperatures. Typically the operation temperature of Fe-based catalyst is in the range of 300–550° C. Thus, in a preferred embodiment of the present invention, the WGS catalyst in reactor 20 comprises both a high temperature and a low temperature catalyst composition in either successive WGS reactors (not shown) or as a single catalyst mixture in a single WGS reactor. Syngas typically exits a syngas reactor at greater than 900° C. The temperature is typically immediately reduced to about 600° C. Accordingly, a more preferred embodiment of the present invention comprises passing the syngas slip stream 16 over a high temperature WGS catalyst at 300–560° C. followed by a cooling system then to a low WGS catalyst at 180–260° C. to achieve the most hydrogen yield possible.

The secondary reactor 20 produces a hydrogen rich stream 22 with as much as 98% conversion of the carbon monoxide to hydrogen. Hydrogen rich stream 22 can then be used to adjust the hydrogen to carbon monoxide ratio of the primary syngas product stream 12. Adjustment of the hydrogen concentration can result in hydrogen to carbon monoxide ratios of from about 1.6 to about 10. Any excess hydrogen can be used in other processes, such as hydrotreating the Fischer-Tropsch products, regeneration or activation of syngas or Fischer-Tropsch catalysts, or any other process that requires hydrogen. Hydrogen balance of the whole process can be adjusted through the adjustment of the flow ratio of the stream 16 versus stream 20.

Another consideration is the buildup of carbon dioxide in the hydrogen rich stream 22 as a second product from the water gas shift reaction. The carbon dioxide will not have a deleterious affect on the Fischer-Tropsch or other downstream reaction and, thus, the entire hydrogen rich stream 22 can be introduced into the syngas stream 18 to produce the adjusted syngas stream 26. Because carbon dioxide is inert to the Fischer-Tropsch process, it can be removed from the Fischer-Tropsch tailgas. Removal of carbon dioxide is well known in the art and is not critical to the present invention. Likewise, if the carbon dioxide were a reactant and would interfere with subsequent processes its removal could be carried out prior to the introduction of hydrogen stream 22 at point 24.

Syngas stream 26 typically will have to be transitioned to be useable in a Fischer-Tropsch or other synthesis reactors, which operate at lower temperatures of about 200° C. to 400° C. The syngas is preferably cooled, dehydrated (i.e., taken below 100° C. to knock out water) and compressed during the transition phase. In this transition of syngas from the syngas reactor 10 to synthesis reactor 30 (FIG. 2), the syngas temperature may go through a temperature window of 50° C. to 1500° C. Therefore, reactor 20 can be selectively placed within the transitional phase continuum where the temperature is appropriate.

Figure 2:
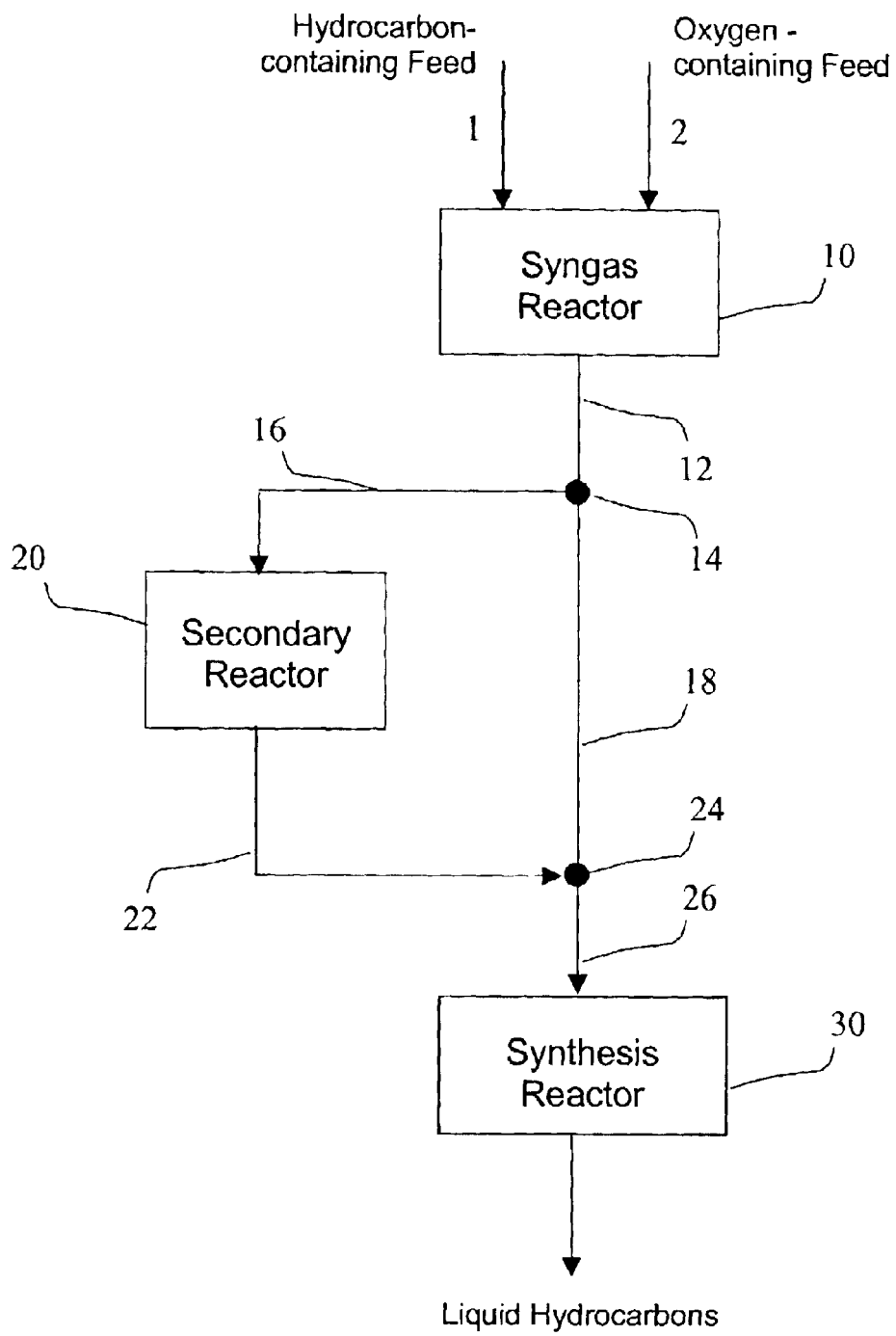
FIG. 2 is a natural gas to liquid hydrocarbon flow diagram in accordance with the present invention.

Now referring to FIG. 2, the combined, hydrogen-adjusted syngas product 26 stream is shown entering a synthesis reactor 30. Synthesis reactor 30 is preferably a Fischer-Tropsch reactor. The Fischer-Tropsch reactor 30 can comprise any of the Fischer-Tropsch technology and/or methods known in the art. The Fischer-Tropsch feedstock is hydrogen and carbon monoxide, i.e., syngas. According to the present invention, the hydrogen to carbon monoxide molar ratio is preferably deliberately adjusted to a desired optimum ratio, preferably about 2:1 to about 2.5:1, but can vary between 0.5:1 and 4:1. The syngas stream 24 is then introduced into the Fischer-Tropsch reactor 30. Fischer-Tropsch catalysts are well known in the art and generally comprise a catalytically active metal, a promoter and a support structure. The most common Fischer-Tropsch catalyst compositions are Fe-based catalysts and Co-based catalysts. The support is generally alumina, titania, zirconia or mixtures thereof. Fischer-Tropsch reactors can use fixed and/or fluid type catalyst beds as well as slurry bubble columns. The literature is replete with particular embodiments of Fischer-Tropsch reactors as well as additional Fischer-Tropsch catalyst compositions on various supports. As the mixed feedstocks contact the catalyst the hydrocarbon synthesis reactions take place according to equation (4).

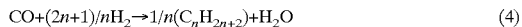

$$CO+(2n+1)/nH_2 \rightarrow 1/n(C_nH_{2n+2})+H_2O \quad (4)$$

The Fischer-Tropsch product contains a wide distribution of hydrocarbon products from $C_5$ to greater than $C_{100}$. For example, fuels with boiling points in the middle distillate range, such as kerosene and diesel fuel, and hydrocarbon waxes may be produced from the synthesis gas.

In another preferred embodiment, the present invention comprises using the improved syngas product stream described above as a reactant feed for further synthesis reactions such as Fischer-Tropsch or alcohols synthesis. As used herein, reference to Fischer-Tropsch reactions is made only by way of example. The present invention should not be limited to Fischer-Tropsch synthesis reactions.

In addition, it should be appreciated that the syngas may undergo various treatments prior to introduction into the secondary reactor 20 and/or prior to the introduction into any final synthesis reactor. The treatments will depend on the process being used, such treatments include but are not limited to: temperature manipulation, water knock out, compression and expansion of the gases, etc. These treatments and their necessity for particular processes are well known to those of ordinary skill in the art.

For example, the present invention is susceptible to embodiments of different forms or order and should not be interpreted to be limited to the particular structures, methods or compositions described herein. In particular, various embodiments of the present invention provide a number of different configurations of the overall gas to liquid conversion process. In addition, the Fischer-Tropsch reactor could be replaced with an alcohols synthesis reactor or any other reactor that can use an adjustable syngas product stream as a reactant or otherwise. Accordingly, the scope of protection is not limited to the embodiments described herein, but is only limited by the claims, the scope of which shall include all equivalents of the subject matter of the claims.

While preferred embodiments of this invention have been shown and described, modification thereof can be made by one skilled in the art without departing from the spirit or teaching of this invention. The embodiments described herein are exemplary only and are not limiting. Many variations and modifications of the system and apparatus are possible and are within the scope of this invention. For example, the present invention is susceptible to embodiments of different forms or order and should not be interpreted to be limited to the particular structures, methods or compositions described herein. In particular, various embodiments of the present invention provide a number of different configurations of the overall gas to liquid conversion process. For example, the Fischer-Tropsch synthesis reactor could be a methanol reactor or the WGS reactor could be a series of high and low temperature WGS reactors located in parallel or in series, the steps are not limited to a stepwise order but can also be carried out simultaneously. Accordingly, the scope of protection is not limited to the embodiments described herein, but is only limited by the claims, which follow, the scope of which shall include all equivalents of the subject matter of the claims.

What is claimed is:

1. A process for producing synthesis gas comprising:
   (a) passing a hydrocarbon containing gas and an oxygen containing gas over a partial oxidation catalyst, under conditions effective to produce a synthesis gas stream comprising hydrogen and carbon monoxide,
   (b) obtaining a slip stream of the synthesis gas of step (a);
   (c) passing the slip stream from step (b) through a plurality of secondary reactors to produce a hydrogen rich product stream;
   wherein at least one secondary reactor is a low temperature water gas shift reactor comprising a Cu based catalyst and one secondary reactor is a high temperature water gas shift reactor comprising a Fe based catalyst; and
   (d) introducing at least a portion of the hydrogen rich product stream of step (c) into the synthesis gas stream of step (a) to produce a combined synthesis gas stream.

2. The process according to claim 1 wherein the low temperature reactor operates from 180° C. to 260° C.

3. The process according to claim 1 wherein the high temperature reactor operates in the range of 300° C. to 560° C.

4. The process according to claim 1 wherein the high temperature water gas shift reactor is upstream of a cooler followed by the low temperature water gas shift reactor.

5. The process according to claim 1 wherein the combined synthesis gas stream has a hydrogen to carbon monoxide ratio of about 1.6 to about 10.

6. The process according to claim 1 wherein the combined synthesis gas stream produced in step (d) has a hydrogen to carbon monoxide ratio of about 2 to about 2.5.

7. The process according to claim 6 wherein the synthesis reactor is a Fischer-Tropsch reactor.

8. The process according to claim 6 wherein the synthesis reactor is a methanol reactor.

9. The process according to claim 6 wherein the synthesis reactor is an alcohols synthesis reactor.

10. The process according to claim 6 wherein the combined synthesis gas stream produced in step (d) has a hydrogen to carbon monoxide ratio of about 1.6 to about 10.

11. The process according to claim 6 wherein the combined synthesis gas stream produced in step (d) has a hydrogen to carbon monoxide ratio of about 2 to about 2.5.

12. The process according to claim 1 further comprising:
   (e) using at least a portion of the hydrogen rich product stream from step (c) for at least one of the following:
   i. hydrotreating hydrocarbons,
   ii. regeneration of a syngas or hydrocarbon synthesis catalyst,
   iii. activation of a syngas or hydrocarbon synthesis catalyst, and
   iv. another process requiring hydrogen outside of the steps of claim 1.

13. The process according to claim 1 further comprising:
   (e) removing of at least a portion of any carbon dioxide from the hydrogen rich product stream used in step (d) prior to introduction of said stream into the synthesis gas stream.

14. The process according to claim 1 wherein at least two of the secondary reactors are operated in parallel.

15. A hydrocarbon gas to liquid conversion process comprising:
   (a) reacting a hydrocarbon containing gas and an oxygen containing gas over a partial oxidation catalyst, under conditions effective to produce a synthesis gas stream comprising hydrogen and carbon monoxide,
   (b) obtaining a slip stream of the synthesis gas of step (a);
   (c) reacting the slip stream from step (b) in a plurality of secondary reactors to produce a hydrogen rich product stream,
   wherein at least one secondary reactor is a low temperature water gas shift reactor comprising a Cu based catalyst and one secondary reactor is a high temperature water gas shift reactor comprising a Fe based catalyst;
   (d) introducing at least a portion of the hydrogen rich product stream of step (c) into the synthesis gas stream of step (a) to produce a combined synthesis gas stream; and
   (e) reacting at least a portion of the combined synthesis gas stream from step (d) in a synthesis reactor.

16. The process according to claim 15 wherein the low temperature reactor operates from 180° C. to 260° C.

17. The process according to claim 15 wherein the high temperature reactor operates from 300° C. to 560° C.

18. The process according to claim 15 further comprising:
   (f) using at least a portion of the hydrogen rich product stream from step (c) for at least one of the following:
   i. hydrotreating hydrocarbons,
   ii. regeneration of a syngas or hydrocarbon synthesis catalyst,
   v. activation of a syngas or hydrocarbon synthesis catalyst, and
   vi. another process requiring hydrogen outside of the steps of claim 1.

19. The process according to claim 15 further comprising:
   (f) removing of at least a portion of any carbon dioxide from the hydrogen rich product stream used in step (d) prior to introduction of said stream into the synthesis gas stream.

20. The process according to claim 15 wherein at least two of the secondary reactors are operated in parallel.

* * * * *